(12) United States Patent
Hazel et al.

(10) Patent No.: US 7,955,694 B2
(45) Date of Patent: Jun. 7, 2011

(54) STRAIN TOLERANT COATING FOR ENVIRONMENTAL PROTECTION

(75) Inventors: Brian T. Hazel, West Chester, OH (US); Michael J. Weimer, Loveland, OH (US); William C. Brooks, Lebanon, OH (US)

(73) Assignee: General Electric Company, Schenectady, NY (US)

( * ) Notice: Subject to any disclaimer, the term of this patent is extended or adjusted under 35 U.S.C. 154(b) by 1089 days.

(21) Appl. No.: 11/425,554

(22) Filed: Jun. 21, 2006

(65) Prior Publication Data

US 2007/0298270 A1 Dec. 27, 2007

(51) Int. Cl.
B32B 15/04 (2006.01)
B32B 27/06 (2006.01)
B32B 15/08 (2006.01)

(52) U.S. Cl. ........ 428/323; 428/329; 428/330; 428/626; 428/469; 428/701; 428/450; 428/451; 416/241 R (58) Field of Classification Search .................. None
See application file for complete search history.

(56) References Cited

U.S. PATENT DOCUMENTS

| | | | |
|---|---|---|---|
| 3,248,249 A | 4/1966 | Collins, Jr. |
| 3,248,250 A | 4/1966 | Collins, Jr. |
| 3,248,251 A | 4/1966 | Allen |
| 4,353,780 A | 10/1982 | Fishter et al. |
| 4,411,730 A | 10/1983 | Fishter et al. |
| 4,537,632 A | 8/1985 | Mosser |
| 4,544,408 A | 10/1985 | Mosser et al. |
| 4,563,239 A | 1/1986 | Adinolfi et al. |
| 4,564,555 A | 1/1986 | Hornberger |
| 4,606,967 A | 8/1986 | Mosser |
| 4,617,056 A | 10/1986 | Mosser et al. |
| 4,659,613 A | 4/1987 | Mosser et al. |
| 4,724,172 A | 2/1988 | Mosser et al. |
| 4,806,161 A | 2/1989 | Fabiny et al. |
| 4,863,516 A | 9/1989 | Mosser et al. |
| 4,889,858 A | 12/1989 | Uno et al. |
| 4,917,960 A | 4/1990 | Hornberger et al. |
| 4,975,330 A | 12/1990 | Mosser |
| 5,066,540 A | 11/1991 | Mosser et al. |
| 5,368,888 A | 11/1994 | Rigney |
| 5,472,783 A | 12/1995 | Mosser et al. |
| 5,723,078 A | 3/1998 | Nagaraj et al. |

(Continued)

OTHER PUBLICATIONS

Krylon Indoor/Outdoor Polyurethane Clear Wood Finish, Gloss, Material Safety Data Sheet, Mar. 4, 2006, pp. 1-6, The Sherwin Williams Company, Cleveland, OH. Krylon Low Odor Clear Gloss Finish, Material Safety Data Sheet, Mar. 4, 2006, pp. 1-5, The Sherwin Williams Company, Cleveland, OH.
Krylon Decorator Spray Paints, Acrylic Crystal Clear, Material Safety Data Sheet, Mar. 4, 2006, pp. 1-6, The Sherwin Williams Company, Cleveland, OH.

*Primary Examiner* — Aaron Austin
(74) *Attorney, Agent, or Firm* — McNees Wallace & Nurick LLC (57) ABSTRACT

A corrosion resistant coating system having a first coating and a second coating. The first coating includes a matrix and corrosion resistant particles. The matrix is preferably a matrix material selected from the group consisting of silica, silicone, phosphate, chromate, and combinations thereof. The corrosion resistant particles are uniformly distributed within the matrix and provide the coating a predetermined coefficient of thermal expansion. The particles provide the first coating with corrosion resistance. The second coating is disposed on at least a portion of the first coating. The second coating includes an organic material capable of sufficiently sealing the pores of the first coating to reduce or eliminate infiltration of contaminant material, and is capable of being removed by exposure elevated temperatures.

15 Claims, 2 Drawing Sheets

U.S. PATENT DOCUMENTS

| | | |
|---|---|---|
| 5,985,454 A | 11/1999 | McMordie et al. |
| 6,074,464 A | 6/2000 | Eddinger et al. |
| 6,224,657 B1 | 5/2001 | Myers et al. |
| 6,283,715 B1 | 9/2001 | Nagaraj et al. |
| 6,368,394 B1 | 4/2002 | Hughes et al. |
| 6,544,351 B2 | 4/2003 | Wang et al. |
| 7,311,940 B2 * | 12/2007 | Nagaraj et al. ............. 427/201 |
| 2003/0043881 A1 * | 3/2003 | Hodgkinson et al. ......... 374/106 |
| 2004/0013802 A1 | 1/2004 | Ackerman et al. |
| 2006/0127694 A1 * | 6/2006 | Hazel et al. ................ 428/652 |
| 2007/0128447 A1 * | 6/2007 | Hazel et al. ................ 428/426 |
| 2007/0141369 A1 * | 6/2007 | Hazel et al. ................ 428/469 |

* cited by examiner

STRAIN TOLERANT COATING FOR ENVIRONMENTAL PROTECTION

FIELD OF THE INVENTION

The present invention is directed to an anti-corrosion coating system, including a temporary organic coating, for use on turbine engine components subjected to moderate temperatures and corrosive environments and methods of applying the coating system to turbine engine components.

BACKGROUND OF THE INVENTION

In an aircraft gas turbine engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against the airfoil section of the turbine blades, which turns the shaft and provides power to the compressor. The hot exhaust gases flow from the back of the engine, driving it and the aircraft forward. The hotter the combustion and exhaust gases, the more efficient is the operation of the jet engine. Thus, there is incentive to raise the combustion gas temperature.

In the compressor portion of an aircraft gas turbine engine, atmospheric air is compressed to 10-25 times atmospheric pressure, and adiabatically heated to 800°-1250° F. in the process. This heated and compressed air is directed into a combustor, where it is mixed with fuel. The fuel is ignited, and the combustion process heats the gases to very high temperatures, in excess of 3000° F. These hot gases pass through the turbine, where rotating turbine wheels extract energy to drive the fan and compressor of the engine, and the exhaust system, where the gases supply thrust to propel the aircraft. To improve the efficiency of operation of the aircraft engine, combustion temperatures have been raised. Of course, as the combustion temperature is raised, steps must be taken to prevent degradation of engine components directly and indirectly as a result of the higher operating temperatures.

The requirements for enhanced performance continue to increase for newer engines and modifications of proven designs, as higher thrusts and better fuel economy are among the performance demands. To improve the performance of engines, the combustion temperatures have been raised to very high temperatures. This can result in higher thrusts and/or better fuel economy. These combustion temperatures have become sufficiently high that even superalloy components not within the combustion path have been subject to degradation. These superalloy components have been subject to degradation by mechanisms not previously generally experienced, creating previously undisclosed problems that must be solved. One recent problem that has been discovered during refurbishment of high performance aircraft engines has been the corrosive pitting of turbine disks, seals and other components that are supplied with cooling air. The cooling air includes ingested particulates such as dirt, volcanic ash, fly ash, concrete dust, sand and sea salt, as well as metal, sulfates, sulfites, chlorides, carbonates, various and sundry oxides and/or various salts in either particulate or gaseous form. These materials are deposited on substrate surfaces. When deposited on metallic surfaces, these materials can interact with one another and with the metallic surface to corrode the surface, which is accelerated at elevated temperatures. The materials used in turbine engines are typically selected on high temperature properties, including their ability to resist corrosion. Even these materials will degrade under severe conditions at elevated temperatures. On investigation of the observed pitting problem, it has been discovered that the pitting is caused by a formation of a corrosion product as a result of the ambient airborne foreign particulate and gaseous matter that is deposited on the disks, seals or other components as a result of the flow of cooling air containing it. This deposition, along with the more elevated temperature regimes experienced by these engine components, has resulted in the formation of the corrosion products. It should be noted that the corrosion products are not the result of exposure of the engine components to the hot gases of combustion, normally associated with oxidation and corrosion products from contaminants in the fuel. The seals, turbine disks and other components under consideration and discussed herein generally are designed so that if a leak is present, the air will leak in the direction of the flow of the hot gases of combustion and not in the direction of the components under consideration.

Because the corrosion products are the result of exposure of the engine components to cooling air drawn from ambient air environments, it is not uniform from engine to engine as aircraft visit different geographic locations with different and distinct atmospheric conditions. For example, some planes are exposed to salt water environments, while others may be subject to air pollutants from highly industrial regions. A variety of coatings have been developed to mitigate corrosion concerns.

Known coating systems, in addition to the coating for mitigating corrosion, hereinafter referred to as a "base coating," also has included an inorganic top coating, such as a phosphate coating. These known systems suffer from the drawback that the top coat remains present at operating temperatures and interferes with the base coating. Specifically, when large temperature fluctuations occur, such as those seen in the engine components exposed to cooling air, the top coat results in degradation of the base coat, including potential failure within the coating, which increases the possibility of corrosion of the engine component. When the inorganic top coat, including phosphate sealant, is directly applied to the base coat, the sealant is believed to infiltrate the pores of the base coating reducing the ability of the base coat to tolerate strain, such as the strain experienced during thermal cycling (i.e., thermal cycles in excess of 500° F./min). In addition to the above, known top coats are difficult to apply, requiring masking and making of the material to produce the coating. For example, a known coating may require 10-12 hours or more to provide the inorganic top coat, wherein the delay adds to the total time and cost required for manufacture of the gas turbine engine.

Elimination of the top coating entirely is also undesirable. The use of a base coat alone (i.e., with no top coat), has a number of disadvantages. First, the base coat is a generally porous coating structure that is susceptible to discoloration and/or staining due to oils or greases that may contact the surface of the engine component during manufacture. Oil, grease or similar contaminants are drawn into the porous structure of the base coat and produce an undesirable appearance, due to the resulting discoloration and/or staining. In addition, the incorporation of contaminants into the porous structure may also reduce the ability to withstand temperature fluctuation and the corrosion resistance of the base coating. Second, the surface appearance of the engine component is generally a dull, matte texture and not aesthetically pleasing. Therefore, it is undesirable to provide components having only a base coating without additional top coatings.

What is needed is a coating system that provides a manufactured component having an aesthetically pleasing surface finish that is protected against surface damage during the manufacturing process and does not detrimentally affect the underlying coating when the turbine engine components are subjected to elevated operating temperatures and extreme changes in temperature in a wide variety of atmospheres. In addition, what is needed is a coating system that can be applied quickly and inexpensively, without the drawbacks of the inorganic top coats known in the art.

SUMMARY OF THE INVENTION

Turbine engine components for use at the highest operating temperatures are typically made of superalloys of iron, nickel, cobalt or combinations thereof, or other corrosion resistant materials such as stainless steels selected for good elevated temperature toughness and fatigue resistance. Illustrative superalloys, all of which are well-known, are designated by such trade names as Inconel®, for example, Inconel® 600, Inconel® 722 and Inconel® 718, Nimonic®, Rene®, for example, Rene® 88DT, Rene® 104, Rene® 95, Rene® 100, Rene® 80 and Rene® 77, and Udimet®, for example, Udimet® 500, Hastelloy, for example, Hastelloy X, HS 188 and other similar alloys. These materials have resistance to oxidation and corrosion damage, but that resistance is generally not sufficient to protect them at sustained operating temperatures now being reached in gas turbine engines. Engine components, such as disks and other rotor components, are made from newer generation alloys that contain lower levels of chromium, and can therefore be more susceptible to corrosion attack. These engine components include turbine disks, turbine seal elements, turbine shafts, airfoils categorized as either rotating blades or stationary vanes, turbine blade retainers, center bodies, engine liners and flaps. This list is exemplary and not meant to be inclusive.

While all of the above listed components may find advantage for the present invention, engine components such as the turbine disks, turbine seal elements and turbine shafts are not directly within the gas path of the products of combustion, and are not typically identified with corrosive products experienced as a result of exposure to these highly corrosive and oxidative gases. Nevertheless, these components have experienced higher operating temperatures and are experiencing greater corrosion effects as a result of these higher operating temperatures. The present invention is a coating system comprising a corrosion resistant base coating and a temporary organic coating applied to these components to provide a manufactured product that is aesthetically pleasing, has little or no damage from manufacture or assembly, and alleviates or minimizes corrosion problems without degradation of the base coating from subsequent coating.

The present invention utilizes a base coating to provide a corrosion resistant coating for engine components such as turbine disks, turbine seal elements and turbine shafts. This base coating may also find application to other turbine components that are subjected to high temperatures and corrosive environments, such as turbine components located within or on the boundary of the gas fluid flow path, including, for example, turbine blades, turbine vanes, liners and exhaust flaps. The corrosion resistant base coating of the present invention on a gas turbine component includes a matrix, wherein the matrix may include, but is not limited to silicon-based, phosphate-based, chromate-based or combinations thereof. Particles are present in the base coating matrix. These particles may be selected from the group consisting of refractory oxides, alumina, MCrAlX, MCr, MAl, MCrX, MAlX and combinations of these particles, substantially uniformly distributed within the matrix. The coating system of the present invention further includes a temporary organic coating which protects the surface of the base coating, but is removable when the system is exposed to operation temperatures.

The coating of the present invention is applied to a high temperature turbine engine component that requires corrosion protection. Corrosion-resistant particles are mixed with a matrix forming composition. The corrosion-resistant particles are preferably selected from the group consisting of refractory oxide particles, alumina, MCr, MAl, MCrX, MAlX and MCrAlX particles where M is an element selected from iron, nickel and cobalt and X is an element selected from the group of gamma prime formers, and solid solution strengtheners, for example, Ta, Re or reactive elements, such as Y, Zr, Hf, Si, La or grain boundary strengtheners consisting of B, and C and combinations thereof. The mixing is accomplished to form a slurry that can be applied to at least a portion of the surface of the component; however, the slurry should result in a substantially uniform coating of the particles with the matrix forming fluid. Of course, the viscosity of the slurry can be adjusted consistent with the method of application of the coating to the component surface. Before the slurry is applied to the surface of the component, the surface of the component typically is treated to enhance its adhesion. Depending on the surface, this preparation may be a mere cleaning of the surface, or it may additionally include a chemical etch or a mechanical roughening. After the slurry is applied to at least a portion of the surface of the component, it is allowed to dry. Drying is typically accomplished in two steps. In the first low temperature step, drying is accomplished to remove unbound fluid from the slurry and form a coating of preselected thickness on at least a portion of the surface of the component. An additional drying may be required to remove any remaining bound fluid, or trapped fluid, from the coating slurry and to initially cure the coating onto the surface, forming a chemical and/or mechanical bond with the surface. After drying the coating is fired to a preselected temperature to form at least a glassy matrix having uniformly distributed particles. Ideally, the coating is fired to a temperature that is equal to or exceeds the temperature that the component surface is expected to experience in operation. After the base coating has been formed, the temporary organic coating is applied. The temporary organic coating is preferably sprayed onto at least a portion of the base coating and permitted to dry. The temporary organic coating seals the surface, including any pores thereon, of the base coating and provides impact and abrasion resistance to the surface of the base coating. The top coating is temporary in that the organic coating material is removed by the exposure to the temperature of gas turbine engine operation.

An advantage of coating systems of the present invention is that they have a coefficient of thermal expansion that is compatible with many of the alloys used for turbine engine articles. Thus, the coating is not limited by spalling that results from thermal cycling resulting from large temperature changes during aircraft engine operation.

Another advantage of the present invention is that it can be used to provide corrosion resistance to engine components that experience cyclic temperatures in excess of 1100° F.

Still another advantage of the base coating of the present invention is that the coefficient of thermal expansion can be varied by varying the amount of refractory oxides, alumina, MCrAlX, MCr, MAl, MCrX, MAlX and combinations thereof, so that the coefficient of thermal expansion can be modified to match or approach the coefficient of thermal expansion of most substrates used in aircraft engines, thereby reducing thermal stresses between the substrate and the coating. As a result, coating failure should not result from thermal cycling.

A related advantage is that the base coating can be applied as multiple layers, with each layer having a different loading of refractory oxides, alumina, MCrAlX, MCr, MAl, MCrX, MAlX and combinations thereof, so that each layer has a different coefficient of thermal expansion. By applying the coating as multiple layers in this manner, the interlayer stresses can be carefully controlled so that they are below the fatigue strength limit for the layers, again eliminating as a failure mechanism fatigue due to thermal cycling.

Yet another advantage of the present invention is that the base coating and the temporary organic coating can be applied as a water-based material, which reduces environmental impact.

Yet another advantage of the present invention is that the manufactured part may be provided with an aesthetically pleasing surface, substantially free of contaminant stains and free of contaminant infiltration into the base coating.

Yet another advantage of the present invention is that the temporary organic coating is removed when the gas turbine engine reaches operational temperatures, which reduces or eliminates degradation of the base coating due to subsequent, overlying coatings.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers are used throughout the drawings to refer to the same or like parts.

DETAILED DESCRIPTION OF THE INVENTION

The present invention is a corrosion resistant base coating applied over a turbine engine component with a temporary organic coating disposed thereon. The corrosion resistant coating comprises refractory oxide particles, alumina, MAl, MAlX, MCr, MCrX, MCrAlX particles or a combination thereof, uniformly distributed in an inorganic matrix forming material. The particles provide the coating with corrosion resistance, while inorganic material in the inorganic matrix forming material is the binder during application and forms the matrix after curing. On curing, the inorganic material forms the matrix containing the corrosion resistant particle that, upon firing, forms the base coating. The system further comprises a temporary organic coating applied on at least a portion of the base coating.

Binder components for formation of the matrix of the base coating suitable for use herein typically comprise a phosphate, chromate, silicone or silica binder, with or without other binder materials. These binders can be in the form of an acid or more typically the respective compounds/compositions. For example, phosphate binders may be present as orthophosphates, pyrophosphates, etc. The compounds/compositions can be monobasic, dibasic, tribasic or any combination thereof. Binder components can comprise one or more metal compounds. For example, metal phosphates may include aluminum phosphates, magnesium phosphates, chromium phosphates, zinc phosphates, iron phosphates, lithium phosphates, calcium phosphates, etc, or any combination thereof. Typically, the phosphate-containing binder component comprises an aluminum phosphate, a magnesium phosphate, a chromium phosphate, or a combination thereof. The binder component can optionally comprise other binder materials, including one or more chromates, molybdates, etc. See, for example, U.S. Pat. No. 3,248,249 (Collins, Jr.), issued Apr. 26, 1966; U.S. Pat. No. 3,248,251 (Allen), issued Apr. 26, 1966; U.S. Pat. No. 4,889,858 (Mosser), issued Dec. 26, 1989; U.S. Pat. No. 4,975,330 (Mosser), issued Dec. 4, 1990, the relevant portions of which are incorporated by reference, in their entirety. The phosphate-containing binder component can also be substantially free of other binder materials, e.g., a substantially chromate free phosphate-containing binder component. See, for example, U.S. Pat. No. 6,368,394 (Hughes et al.), issued Apr. 9, 2002 (substantially chromate free phosphate binder component), the relevant portion of which is incorporated by reference, in its entirety.

As used herein, the term "CTE" refers to the coefficient of thermal expansion of a material, and is referred to herein in units of $10^{-6}/°$ F. For example, alumina, which has a coefficient of thermal expansion of about 4 to $5 \times 10^{-6}/°$ F. at about 1200° F. (649° C.), is referred to herein as having a CTE of about 4 to 5.

Figure 1:
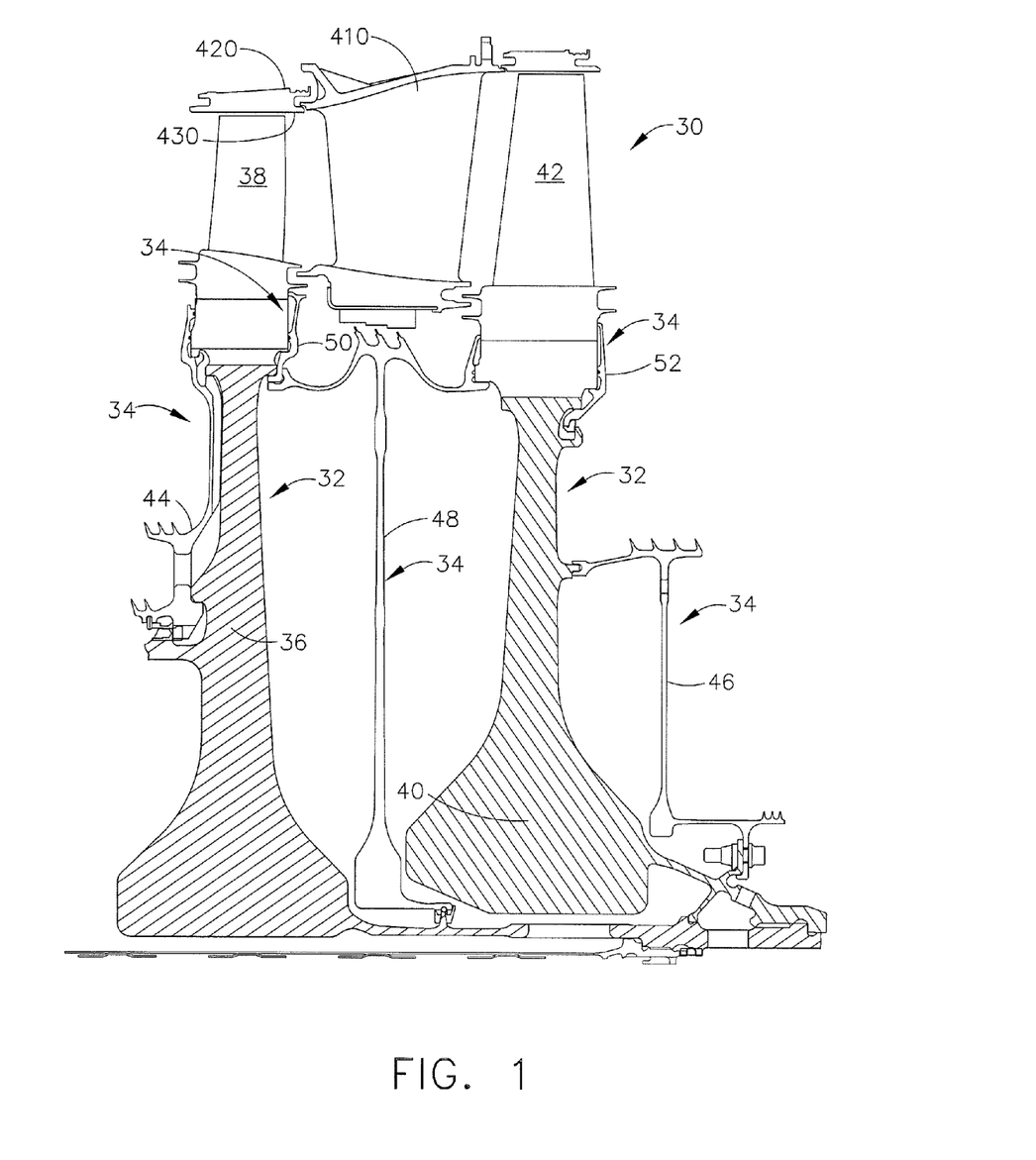
FIG. 1 is a cross-sectional view of a portion of the turbine section of a gas turbine engine.

FIG. 1 is a cross-sectional view depicting a portion of the turbine section of a gas turbine engine along the centerline of the engine. The turbine section 30, shown, is a two stage turbine, although any number of stages may be employed depending on the turbine design. The present invention is not limited by the number of stages in the turbine shown. Turbine disks 32 are mounted on a shaft (not shown) extending through a bore in disks 32 along the centerline of the engine, as shown. A first stage blade 38 is attached to first stage disk 36, while second stage blade 42 is attached to second stage disk 40. A vane 410 extends from a casing 420. The inner surface of casing 420 forms a liner 430 for the hot gases of combustion which flow in the gas flow path. The first stage blade 38, the second stage blade 42 and the vane 410 extend into the hot gas flow path. The vane 410 is stationary and serves to direct the hot gas flow while blades 38, 42 mounted on disks 36, 40 rotate as the hot gases impinge on them, extracting energy to operate the engine.

Sealing elements 34, a forward seal 44, an aft seal 46, an interstage seal 48, a stage 1 aft blade retainer 50 and a stage 2 aft blade retainer 52, serve to seal and complete the compressor air cooling circuits to the turbine blades and nozzles. These seals are in contact with the disks and rotate with the disks. Interstage seal 48 is positioned inboard of vane 410 and between the first stage disk 36 and the second stage disk 40. Also shown are optional blade retainers 50, 52 which lock the blades to the disks. The design of such retainers will vary dependent on engine design, with some engine designs not requiring them.

These seals and blade retainers are heated to the temperatures of the cooling circuit air they direct. In addition, the parts closest to the combustion path are also heated by conductive heat transfer from the combustion path parts. For example, the rim of the turbine disks 32 are conductively-heated by the turbine blades 38, 42. Contaminants in the cooling air, as previously discussed, deposit on the surfaces of the disks, seals and retainers that form the cooling cavities and are the source of contamination at these elevated temperatures. Thus, the present invention can provide protection to any of these surfaces that are subject to corrosion due to deposition or accumulation of the cooling air contaminants.

Figure 3:
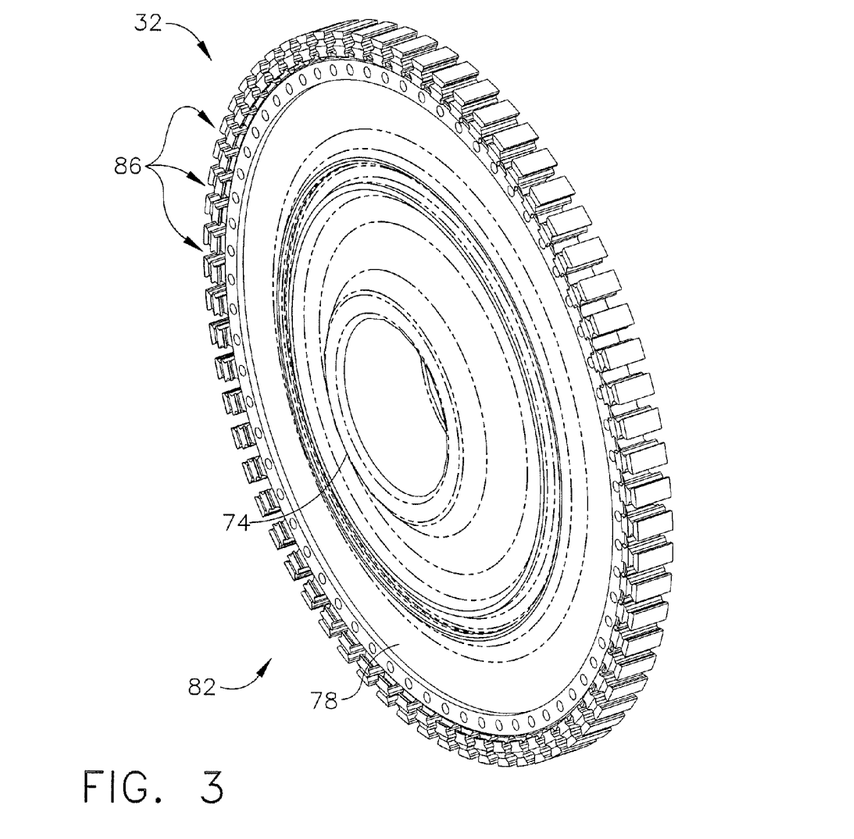
FIG. 3 is a perspective view of a turbine disk, as viewed from the front or fan portion of the engine in the direction of gas flow, showing where the corrosion resistant coating of this invention can be desirably located.

FIG. 3 is a perspective view of a typical gas turbine engine disk 82 such as disk 36 or 40 of FIG. 1, which is typically made of a superalloy material, such as one of the superalloy materials previously discussed. The disk 82 includes a hub 74 along typically the engine centerline that includes a bore through which a shaft (not shown) extends. The disk includes dovetail slots 86 along the disk outer periphery into which the turbine blades 38, 42 are inserted. A web section 78 of the disk 82 extends between the outer periphery, where the dovetail slots are located, and the hub. While the present invention, including the base coating and temporary organic coating, may be utilized anywhere along disk 82, including the dovetail slots 86, it finds particular use along the surfaces of web section 78 and the dovetail slots 86, which unlike the bore in hub 74, is directly exposed to the high temperature cooling air.

Figure 2:
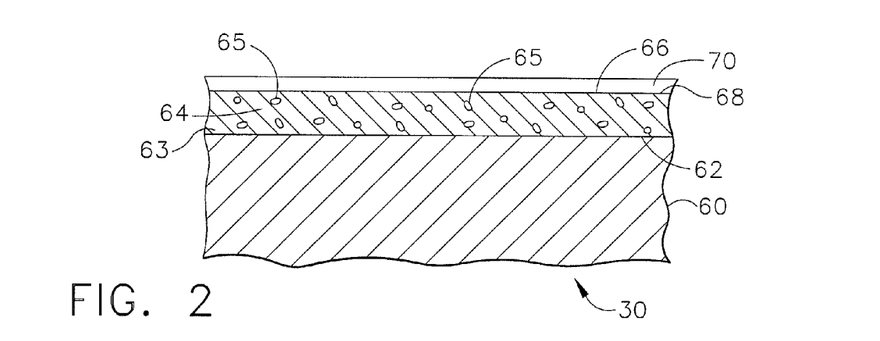
FIG. 2 is a cross-sectional representation of a single layer of coating of the present invention applied to a substrate.

FIG. 2 depicts, in cross-section, the coating of the present invention in its simplest form, deposited on an engine component. Corrosion resistant base coating 64 is deposited on the surface 62 of substrate 60. The substrate 60 may be a turbine engine disk such as first stage disk 36 or second stage disk 40. The substrate 60 may be a typical surface such as web section 78 of a turbine disk 82. If desired, substrate 60, comprising a superalloy based on nickel, cobalt, iron and combinations thereof, may also include a compliant coating over substrate surface 62. The compliant coating may include a material such as a MCrAlX coating, for example, a NiCrAlY, a NiCoCrAlY, an aluminide such as NiAl or noble metal-modified aluminide such as (Pt,Ni)Al. As discussed previously, base coating 64 can be cured as a single layer of graded coating and surface 66 is exposed to the cooling air forming the environment for the surface. Alternatively, base coating 64 may be of substantially uniform composition. If the coating is to be graded, then additional layers are applied over base coating 64, the first layer being applied over outer surface 66 and additional layers being applied over subsequent outer layers.

Prior to forming the corrosion resistant base coating 64 of this invention on the surface 62 of metal substrate 60, metal surface 62 is typically pretreated mechanically, chemically or both to make the surface more receptive for base coating 64. Suitable pretreatment methods include grit blasting, with or without masking of surfaces that are not to be subjected to grit blasting (see U.S. Pat. No. 5,723,078 to Nagaraj et al., issued Mar. 3, 1998, especially col. 4, lines 46-66, which is incorporated by reference, in its entirety), micromachining, laser etching (see U.S. Pat. No. 5,723,078 to Nagaraj et al., issued Mar. 3, 1998, especially col. 4, line 67 to col. 5, line 3 and 14-17, which is incorporated by reference, in its entirety), treatment with chemical etchants such as those containing hydrochloric acid, hydrofluoric acid, nitric acid, ammonium bifluorides and mixtures thereof, (see, for example, U.S. Pat. No. 5,723,078 to Nagaraj et al., issued Mar. 3, 1998, especially col. 5, lines 3-10; U.S. Pat. No. 4,563,239 to Adinolfi et al., issued Jan. 7, 1986, especially col. 2, line 67 to col. 3, line 7; U.S. Pat. No. 4,353,780 to Fishter et al., issued Oct. 12, 1982, especially col. 1, lines 50-58; and U.S. Pat. No. 4,411,730 to Fishter et al., issued Oct. 25, 1983, especially col. 2, lines 40-51, all of which are incorporated by reference, in their entirety), treatment with water under pressure (i.e., water jet treatment), with or without loading with abrasive particles, as well as various combinations of these methods. Typically, the surface 62 of metal substrate 60 is pretreated by grit blasting where surface 62 is subjected to the abrasive action of silicon carbide particles, steel particles, alumina particles or other types of abrasive particles. These particles used in grit blasting are typically alumina particles and typically have a particle size from about 600 to about 35 mesh (from about 25 to about 500 micrometers), more typically from about 360 to about 35 mesh (from about 35 to about 500 micrometers).

After the surface preparation is completed, the base coating is applied. A suitable base coating for use with the invention is disclosed in U.S. patent application Ser. No. 11/011,695, entitled CORROSION RESISTANT COATING COMPOSITION, COATED TURBINE COMPONENT AND METHOD FOR COATING SAME, filed on Dec. 15, 2004, assigned to the assignee of the present application and incorporated herein by reference, in its entirety. Another suitable base coating includes U.S. patent application Ser. No. 11/311,720, entitled STRAIN TOLERANT CORROSION PROTECTING COATING AND SPRAY METHOD OF APPLICATION, filed on Dec. 19, 2005, assigned to the assignee of the present application and incorporated herein by reference, in its entirety. Another suitable base coating includes U.S. patent application Ser. No. 11/293,448, entitled CORROSION INHIBITING CERAMIC COATING AND METHOD OF APPLICATION, filed on Dec. 2, 2005, assigned to the assignee of the present application and incorporated herein by reference, in its entirety. Other suitable base coatings include aqueous corrosion resistant coating compositions comprising phosphate/chromate binder systems and aluminum/alumina particles. See, for example, U.S. Pat. No. 4,606,967 (Mosser), issued Aug. 19, 1986 (spheroidal aluminum particles) and U.S. Pat. No. 4,544,408 (Mosser et al.), issued Oct. 1, 1985 (dispersible hydrated alumina particles), which are herein incorporated by reference in their entirely.

When additional layers of coating are to be applied over surface 66 in order to obtain a graded, multi-layer coating, it is generally not necessary to prepare coating surface 66 prior to application of additional layers.

While the above provide examples of preferred usages for the coating of the present invention, the invention is not so limited and may be used in any application where corrosion of base metal is evident. The base coating of the present invention is preferably applied as a coating in thicknesses from about 0.0001" (0.1 mils) to about 0.005" (5 mils), and preferably in thicknesses from about 0.0005" (0.5 mils) to about 2.5". The coating can be applied to such thicknesses as a single layer, or can be applied as a plurality of distinct layers to achieve an overall thickness in these ranges.

A preferred embodiment of the present invention includes a coating applied to form a matrix having corrosion resistant particles substantially uniformly dispersed throughout. The corrosion resistance is provided by particles of refractory oxide, alumina, MCrAlX or combinations of these particles. The matrix can be formulated in any one of a number of ways. However, a water-based system utilizes a matrix forming component. The viscosity can be adjusted by adding water or allowing water to evaporate in order to obtain the desired viscosity.

Matrix forming materials preferably comprise a phosphate binder, with or without other binder materials. Although phosphate binders are preferred, other binder materials, such as colloidal silica and silicone may be utilized. The phosphate binders can be in the form of phosphoric acid or more typically the respective phosphate compounds/compositions, including orthophosphates, pyrophosphates, and other phosphate compounds. These phosphate compounds/compositions can be monobasic, dibasic, tribasic or any combination thereof. The phosphate-containing binder component can optionally comprise other binder material, including one or more chromates, molybdates, or similar binder material.

The corrosion resistant particles are added to the matrix forming solution. Specifically, the corrosion resistant particles are added to the binder material, such as solutions or dispersions containing phosphate, colloidal silica or silicone. These particles may include refractory oxide particles that can impart corrosion resistance to a coating, such as alumina, yttrium oxide ($Y_2O_5$), zirconium oxide ($Zr_2O_3$), titanium oxide ($TiO_2$) and combinations thereof. Other suitable materials include ceramics with a CTE greater than that of alumina and that are relatively inert or non-reactive. While oxides of other metals may be used, such as tungsten, chromium and rhenium, these are less preferred as they are not deemed to be as environmentally friendly as the preferred refractory oxides. Alternatively, MCrAlX, MCr, MAl, MCrX or MAlX particles may be added to the solution, either alone or in combination with the refractory oxide particles to provide a layer with a predetermined CTE.

For example, the particles may be added to a colloidal silica dispersion so that the particles comprise, by weight, from 5-60% of the total solution, up to 15% surfactant and the balance being one of the LP colloidal silica dispersion. Thus, for example, for an LP30 colloidal solution, when particles are added to about 30% by weight, about 21% by weight comprises silica solids, up to 10% is a surfactant and the balance of the solution, about 49% comprises water. The particles are provided in a size range of 25 microns and smaller. The particles may be substantially equiaxed (spherical) or non-equiaxed (flake). Preferably the particles are 10 microns and smaller in size. If a high particle density is desired, the particles should be provided in at least two sizes. In such a circumstance, the average particle size preferably should differ by a factor of about 10. The size difference between the particles allows the smaller particles to fill the areas between the larger particles. This is particularly evident when the particles are substantially equiaxed. Thus, if high packing density is required and the size of particles is about 5 microns, then a second size range of particles should also be included wherein the particles are 0.5 microns and smaller. The packing density of the particles will have some effect on the CTE of the layer.

The composition for formation of the base coating according to the present invention may includes a material identified as LBK-51F, which comprises, in weight percent, about 10% Triton™-X surfactant, about 22.5% LUCALOX® alumina, the balance, about 67.5%, being colloidal silica. A second suitable composition includes LBK-51G, comprising, in weight percent, about 2% surfactant, about 24.5% alumina, −325 mesh that is acid washed and the balance, about 73.5% colloidal silica. Both compositions may be applied by spraying. LUCALOX® is a registered trademark of General Electric Company, Fairfield, Conn., and LUCALOX® alumina is a polycrystal alumina available from the same company. The Triton™-X series surfactants are nonionic octylphenol ethoxylate-type surfactants recognized for their wetting and detergency available from Dow Chemical.

After the corrosion resistant particles have been added to the solution to form a slurry, the slurry viscosity is adjusted by either adding liquid or adding additional particles to the mixture. Surfactants and dispersants may be added to the slurry when required. The viscosity should be adjusted, if required, to be consistent with the intended method of application. If the slurry is to be sprayed, the viscosity should be adjusted to be very low, whereas if the slurry is to be applied as a gel, using, for example, a doctor blade to adjust the thickness, then liquid should be removed so that the slurry does not flow readily. Even more liquid should be removed if the slurry is to be formed into a tape. In the last two examples, the final viscosity adjustment may be made after mixing is complete. Regardless of the intended method of application, the mixture is thoroughly agitated. Agitation can be accomplished by any convenient method. Depending on the particles, it is believed that the surfaces of the particles become hydrolyzed, which may allow bonding with the hydrolyzed silica-based material.

In a preferred embodiment, the viscosity is adjusted so that the slurry can be applied by spraying. In this circumstance, the slurry is continuously agitated by placing it on a ball mill until it is ready for application. Even as the slurry is sprayed, the slurry can be pneumatically agitated by using a pot on a spray gun. The slurry is applied preferably using a Bosch spray gun having an adjustable orifice. The orifice size must be larger than the largest particles in the slurry. The slurry is sprayed at a pressure of about 20-60 psi. The coating is applied to a preselected thickness, with a larger orifice being selected when a thicker coating is desired.

After the mixture is applied to the surface of the component, it is allowed to dry. Drying is accomplished in two steps. In the first step, drying is accomplished to remove unbound water. This is accomplished after application of the mixture, either as a spray coating, a gel, or a paste to the surface of the component, preferably by increasing the temperature to a temperature sufficient to provide increased drying, but below 212° F. (100° C.), or by reducing the humidity to below 30% relative humidity. It will be recognized by those skilled in the art that higher humidity and/or lower temperatures will also provide drying, but will require longer times to achieve the necessary drying. When the coating is applied to a thickness of 0.001" (one mil) or greater, heating is preferably accomplished at a rate of no greater than about 5-15° F./min. to prevent blistering. Next, the coating is heated to a temperature of about 400° F. or higher to drive off unbound water and cure the material to form base coating 64. Thereafter, the temporary organic coating 70 is applied to the surface and permitted to dry and/or cure. The application of the temporary organic coating 70 is preferably sufficiently thick to provide the surface with a glossy finish. Alternatively, heat may be applied to the surface to decrease the time required to dry and/or cure. High temperature curing or firing is generally not required. The application of the temporary organic coating 70 may be achieved utilizing any known coating technique, including, but not limited to brushing, rolling, spraying and dipping.

In another embodiment of the present invention, a graded or layered coating may be achieved by applying additional layers over the first layer and subsequent layers, each subsequent layer applied after drying to remove unbound water. Of course, each layer is adjusted to have a different loading of particles and or particles of different compositions, the loading and type of particles determining the CTE of the layer. If the graded coating is applied in this manner, there may be some mixing of the loadings at the interface between layers. On curing, there will be strong bonding between the layers, and except for the loadings and/or types, the coating will act as a uniform coating. Since the CTE can be tailored with thickness, the resulting stresses and strains can be designed as a function of coating thickness. This permits, if desired, the use of a highly corrosion resistant, low CTE particle such as alumina, in a coating layer, which layer can be applied over a less corrosion resistant, higher CTE coating layer, such as a layer that includes CoNiCrAlY particles without negatively affecting the adhesion of the coating to the substrate. The temporary organic coating 70 is applied to the graded or layered coating and provides sealing and abrasion and/or impact resistant to the surface. The organic coating seals the top layer of the coating system providing a graded or layered coating that is well bonded and is capable of withstanding large temperature fluctuations. The organic coating may or may not infiltrate the base coat. The organic coating volatilizes and/or burns away when exposed to the operating temperature of the gas turbine engine leaving the base coating substantially unaffected in the base coating's strain tolerant properties during operation.

The coating of the present invention is comprised of a matrix 63 having substantially uniformly dispersed particles 65 of R and $R_1$ within the matrix in FIG. 3. While R and $R_1$ may be any of the corrosion resistant refractory oxide, alumina, MCr, MCrX, MAl, MAlX or MCrAlX particles, here R represents CoNiCrAlY particles and $R_1$ represents zirconia particles. The CoNiCrAlY particles are depicted as surrounded by the matrix. The dispersed zirconia particles and the CoNiCrAlY particles provide the coating with corrosion resistance. The particle composition or combination of particles of various compositions are selected to provide a sufficiently similar CTE between the base coating 64 and the substrate 60, while preventing spalling. If the required level of corrosion resistance and required CTE could not be achieved, then intermediate layers having intermediate CTE's could be applied over the substrate and below the layer having the required corrosion resistance.

Overlying base coating 64 in FIG. 2 is temporary organic coating 70. Temporary organic coating 70 is an organic sealant composition. Organic sealant compositions suitable for use with the invention preferably includes an organic material including resins such as, but not limited to, latex acrylics, solvent acrylics, polyurethanes, polysulfides and any other organic material capable of sealing pores of the base coating 64 and capable of being removed at elevated temperatures, such as those temperatures present during operation of the gas turbine engine. The organic material may include fillers, pigments or other resin additives known in the art. Preferred organic materials include unpigmented acrylic paint, unpigmented polyurethane paint and unpigmented latex paint.

The temporary organic coating 70 may be applied by any suitable application process, including, but not limited to, brushing, rolling, spraying or dipping. A preferred application method is spraying. The organic material is preferably permitted to dry and/or cure at room temperature, but may also be heated to facilitate the drying and/or curing of the temporary organic coating 70. The thickness of the dried and/or cured coating is preferably sufficient to provide a glossy finish. The coating thickness of the temporary organic coating 70 is from about 0.0001 inches to about 0.0050 inches. The application is preferably substantially 100% coverage wherein water beading on the surface, as opposed to infiltrating the base coating 64, indicates sufficient coating thickness. The entire engine component may be coated with the temporary organic coating 70, wherein no masking is required and the heating step is optional. The elimination of masking during application of the temporary organic coating 70 will optionally allow coverage on a variety of components including seal teeth, contact interfaces, and similar components subject to cooling air. As the temporary organic coating 70 will volatilize and/or burn away during operation, the seal teeth, contact interfaces, and similar will return to an uncoated condition as if they were never coated with the temporary organic coating 70. The application and drying of the temporary organic coating 70 on a gas turbine engine component preferably requires less than about 6 hours, more preferably less than about 4 hours. The temporary organic coating 70 may be removed by exposure to elevated temperatures. Preferably the temporary organic coating 70 is removed during gas turbine engine operation. For example, the temporary organic coating 70 may be removed by exposure to temperatures of greater than about 500° C. The removal preferably occurs at temperature at which gas turbine engines operate. Removal includes volatilization of the temporary organic coating 70. While the organic material may volatilize, the removal may take place by other mechanisms, such as burning or delamination resulting from the exposure to the temperatures greater than about 500° C.

The temporary organic coating 70 is applied after base coating 64 and preferably before further processing of the component occurs. The temporary organic coating 70 provides protection for the base coating 64 and the substrate 60 against damage that may occur during manufacture of the component and assembly of the gas turbine engine. The temporary organic coating 70 provides resistance against impact damage and/or abrasion. In addition, the temporary organic coating 70 seals the pores of the base coating 64, providing protection against infiltration of contaminants such as oil or grease, which may stain or damage the base coating 64.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A corrosion resistant coating system comprising:
    a base coating comprising:
        a matrix, and
        corrosion resistant particles uniformly distributed within the matrix and which provide the base coating with a predetermined coefficient of thermal expansion, and wherein the corrosion resistant particles further provide the base coating with corrosion resistance; and
    a temporary coating disposed on at least a portion of the base coating comprising:
        an organic material capable of sufficiently sealing the surface of the base coating to reduce or eliminate infiltration of contaminant material;
    wherein the temporary coating volatilizes to return the base coating to a substantially uncoated condition when exposed to temperatures greater than about 500° C.

2. The system of claim 1, wherein the organic material comprises a material selected from the group consisting of latex acrylics, solvent acrylics, polyurethanes, polysulfides, and combinations thereof.

3. The system of claim 1 wherein the matrix is selected from the group consisting of a silicon-based matrix, a silicone-based matrix, a phosphate-based matrix, a chromate-based matrix or combinations thereof.

4. The system of claim 1 wherein the corrosion resistant particles are selected from the group consisting of $Al_2O_3$, $Y_2O_3$, $Zr_2O_3$, $Ti_2O_3$ and combinations thereof.

5. The system of claim 1, wherein the predetermined coefficient of thermal expansion of the coating is greater than the coefficient of thermal expansion of a layer of alumina.

6. The system of claim 1, wherein the corrosion resistant particles are selected from the group consisting of MAl, MAlX, MCr, MCrX, MCrAlX particles and combinations thereof, where M is an element selected from the group consisting of nickel, iron cobalt and combinations thereof and X is an element selected from the group consisting of La, Ta, Re, Y, Zr, Hf, Si, B, C and combinations thereof, the metal particles being uniformly distributed within the matrix to provide the base coating with a predetermined coefficient of thermal expansion.

7. The system of claim 1, wherein the temporary second coating is an outer layer.

8. A corrosion resistant turbine engine component comprising:
   a turbine engine component, and
   a base coating comprising at least one layer of a coating resistant to corrosion overlying at least a portion of the engine component, the coating comprising:
      a matrix; and
      corrosion resistant particles uniformly distributed within the matrix and being selected to provide the base coating with a preselected coefficient of thermal expansion; and
   a temporary coating disposed on at least a portion of the base coating comprising:
      an organic material capable of sufficiently sealing the surface of the base coating to reduce or eliminate infiltration of contaminant material;
   wherein the temporary coating volatilizes to return the base coating to a substantially uncoated condition when exposed to temperatures greater than about 500° C.

9. The component of claim 8, wherein the organic material comprises a material selected from the group consisting of latex acrylics, solvent acrylics, polyurethanes, polysulfides, and combinations thereof.

10. The component of claim 8, wherein the matrix is selected from the group consisting of a silicon-based matrix, a silicone-based matrix, a phosphate-based matrix, a chromate-based matrix or combinations thereof.

11. The component of claim 8, wherein the corrosion resistant particles are selected from the group consisting of $Al_2O_3$, $Y_2O_3$, $Zr_2O_3$, $Ti_2O_3$ and combinations thereof.

12. The component of claim 8, wherein the predetermined coefficient of thermal expansion of the coating is greater than the coefficient of thermal expansion of a layer of alumina.

13. The component of claim 8, wherein the base coating further includes corrosion resistant particles selected from the group consisting of MAl, MAlX, MCr, MCrX, MCrAlX particles and combinations thereof, where M is an element selected from the group consisting of nickel, iron cobalt and combinations thereof and X is an element selected from the group consisting of La, Ta, Re, Y, Zr, Hf, Si, B, C and combinations thereof, the metal particles being uniformly distributed within the matrix to provide the coating with a predetermined coefficient of thermal expansion.

14. The component of claim 8, wherein the gas turbine engine component is a component selected from the group consisting of turbine disks, seals, and shafts.

15. The component of claim 8, wherein the temporary second coating is an outer layer.

* * * * *